United States Patent [19]

Hidaka et al.

[11] Patent Number: 4,903,268

[45] Date of Patent: Feb. 20, 1990

[54] SEMICONDUCTOR MEMORY DEVICE HAVING ON-CHIP ERROR CHECK AND CORRECTION FUNCTIONS

[75] Inventors: Hideto Hidaka; Kazuyasu Fujishima; Masaki Kumanoya; Hideshi Miyatake; Katsumi Dosaka; Tsutomu Yoshihara, all of Itami, Japan

[73] Assignee: Mitsubishi Denki Kabushiki Kaisha, Tokyo, Japan

[21] Appl. No.: 161,890

[22] Filed: Feb. 29, 1988

Related U.S. Application Data

[63] Continuation-in-part of Ser. No. 911,433, Sep. 25, 1986, abandoned.

[30] Foreign Application Priority Data

Sep. 26, 1985 [JP] Japan ............................... 60-215472

[51] Int. Cl.⁴ .................. G06F 11/10; G01R 31/28
[52] U.S. Cl. ............................. 371/40.1; 371/21.1
[58] Field of Search ............ 371/38, 21; 365/200, 365/201

[56] References Cited

U.S. PATENT DOCUMENTS

| | | |
|---|---|---|
| 3,988,580 | 10/1976 | Warman et al. ............. 371/38 |
| 4,334,309 | 6/1982 | Bannon et al. ............. 371/38 |
| 4,453,251 | 6/1984 | Osman .................... 371/51 |
| 4,698,812 | 10/1987 | Peterson ................. 371/38 |

OTHER PUBLICATIONS

Chen et al., Error-Correcting Codes for Semiconductor Memory Applications, State-of-the-Art Review, IBM J. Res. Dev., vol. 28, No. 2, Mar. 1984, pp. 124-134.

Quinn et al., Dynamic Testing of Memory Arrays which Utilize ECC Logic, Electronic Engineering, Mar. 1981, pp. 111-119.

Primary Examiner—Charles E. Atkinson
Attorney, Agent, or Firm—Lowe, Price, LeBlanc, Becker & Shur

[57] ABSTRACT

A semiconductor memory comprises a data bit memory cell array (3), a check bit memory cell array (4), and an address decoder (19) which includes a switching circuit (20) for selectively accessing data from either the memory cell array (3) or (4). Decoding signals $d_l$ to $d_m$ are used for reading out data latched by a column address strobe (CAS) signal. The decoding signals are applied to either the memory cell array (3) or (4) through a group of switching elements selectively rendered conductive by complementary signals $\phi$ and $\overline{\phi}$. The logical values of the signals $\phi$ and $\overline{\phi}$ change responsive to a change in the CAS signal state.

7 Claims, 7 Drawing Sheets

(a) TE
(b) /RAS
(c) /CAS
(d) ADDRESS
(e) $\phi$
(f) $\emptyset$
(g) $\overline{\emptyset}$

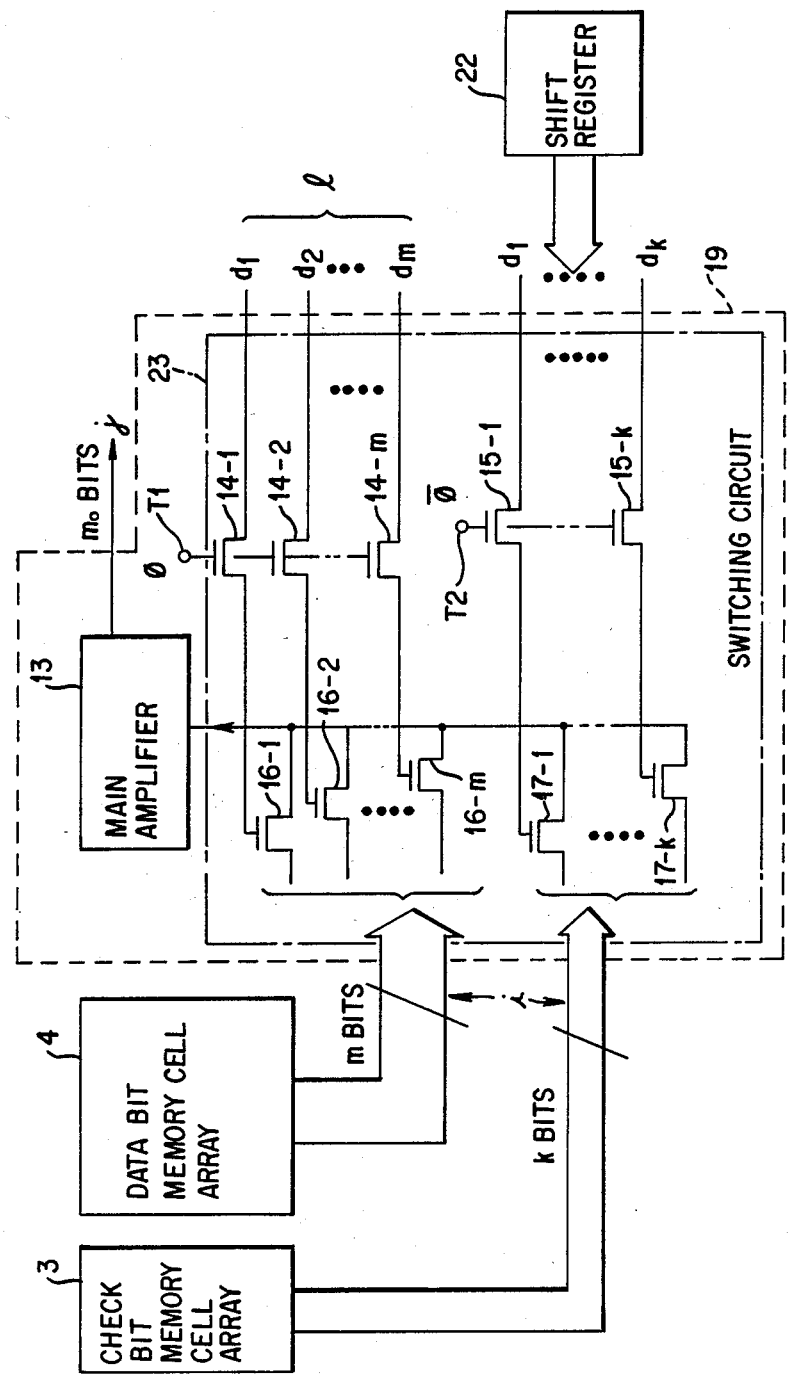

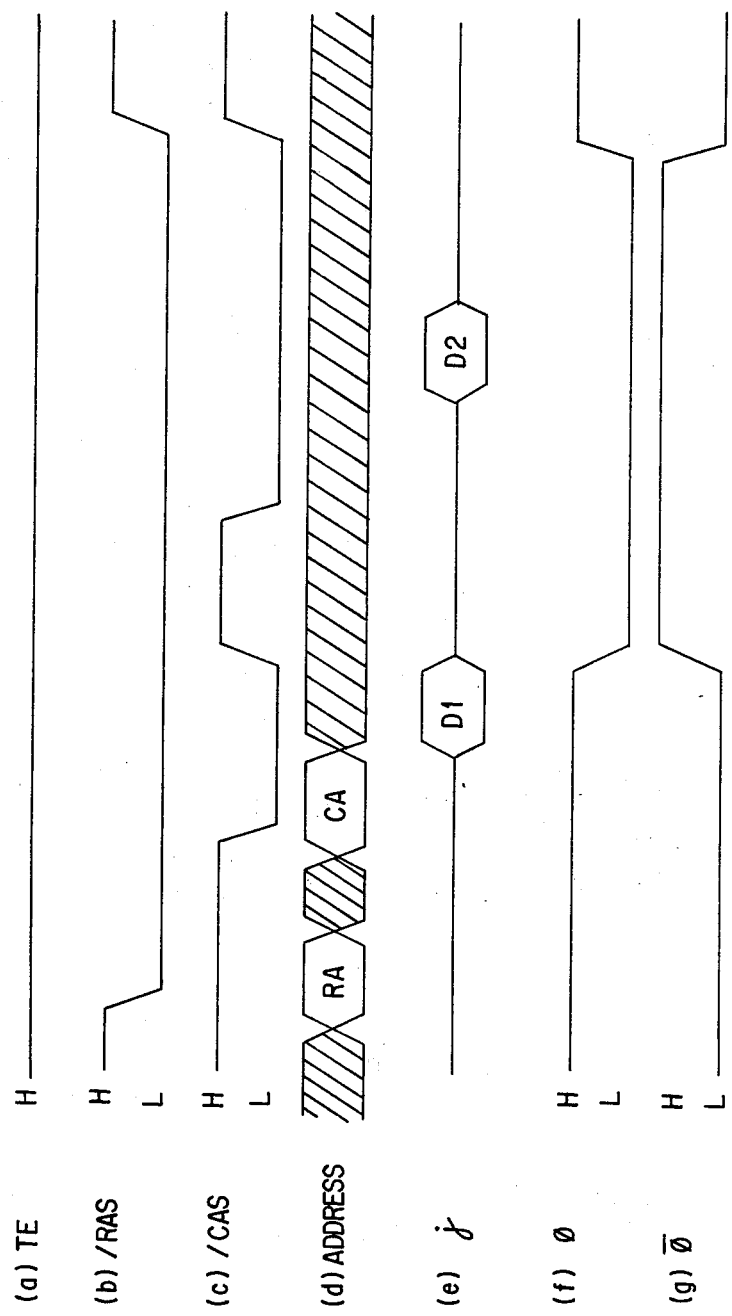

SEMICONDUCTOR MEMORY DEVICE HAVING ON-CHIP ERROR CHECK AND CORRECTION FUNCTIONS

This application is a continuation-in-part of application Ser. No. 911,433, filed Sept. 25, 1986.

TECHNICAL FIELD

The present invention relates to a semiconductor memory device, and more particularly to a semiconductor memory device in which data can be independently accessed for external testings of function from not only a data bit memory cell array but also a check bit memory cell array.

BACKGROUND ART

Recently, malfunction of memory cell by incidence of α particles has been becoming a problem, with high integration of semiconductor memory devices. In order to solve this problem, Error Check and Correction (ECC) functions are provided on the same substrate of the semiconductor memory devices. In other words, on-chip ECC is provided. Such ECC functions are disclosed in, for example, an article by C. L. Chen and M. Y. Hsiao, entitled "Error-Correcting Codes for Semiconductor Memory Applications: A State-of-the-Art Review", IMB J. Res. Develop, vol. 28, No. 2 (1984), pp. 124–134; Japanese Laying-Open Gazette No. 143600/1981 entitled "Device for Preventing Errors from Cumulating in Data; and an article by M. D. Quinn and D. Richter, entitled "Dynamic Testing of Memory Arrays which Utilize ECC Logic", Electronic Engineering, March, 1981, pp. 111–119.

FIG. 1 is a schematic block diagram showing an example of a conventional on-chip ECC circuit using Hamming codes for error correction.

First, structure of the conventional on-chip ECC circuit shown in FIG. 1 will be described. In FIG. 1, a plurality of data bits a (m bits) are applied to an input terminal 1. The data bits a are applied to both a data bit memory cell array 3 and a write check bit generating circuit 2. The write check bit generating circuit 2 generates write check bits b including k bits from the data bits a including m bits, and applies them to a check bit memory cell array 4. The data bit memory cell array 3 and the check bit memory cell array 4 constitute a memory cell array 5. In addition, the data bit memory cell array 3 outputs new data bits c including m bits, and applies them to both a read check bit generating circuit 6 and a data correction circuit 9. The check bit memory cell array 4 outputs new write check bits d including k bits, and applies them to both a syndrome generating circuit 7 and the data correction circuit 9. The read check bit generating circuit 6 generates new read check bits e including k bits from the data bits c including m bits, and applies them to the syndrome generating circuit 7. The syndrome generating circuit 7 performs an Exclusive-OR operation of the read check bits e and the write check bits d, so that a syndrome f including k bits is applied to a syndrome decoder 8. The syndrome decoder 8 decodes the syndrome f, so that syndrome decoding data g including (m+k) bits is applied to the data correction circuit 9. The data correction circuit 9 corrects the data bits c and the write check bits d responsive to the syndrome decoding data g, so that the corrected data h is applied to the memory cell array 5 and an external output data i is applied to an address decoder 10. The address decoder 10 selects the external output data j according to address information l, which data j is outputted through an output terminal 11.

Now, an operation of the conventional on-chip ECC circuit shown in FIG. 1 will be described.

First, the data bit a inputted into the input terminal 1 is written into the data bit memory cell array 3 and at the same time, is applied to the write check bit generating circuit 2. The write check bit generating circuit 2 is a circuit generating check bits including k bits from data bits including m bits. The read check bit generating circuit 6 has the same construction and functions as those of the circuit 2. The check bits b, including k bits generated from the data bits a in the write check bit generating circuit 2, is written into the check bit memory cell array 4. A block of (m+k) bits (referred to as a "ECC code word" hereinafter) comprising the data bits a, including m bits and the check bits b, including k bits becomes a unit of bit for ECC, and the error check and correction is performed for each ECC code word.

Then, when data is read out from the memory cell array 5, the data bits c including m bits and the check bits d including k bits are concurrently read out from the data bit memory cell array 3 and the check bit memory cell array 4, respectively. The read check bit generating circuit 6 generates the read check bits e including k bits from the data bits c including m bits, and applies them to the syndrome generating circuit 7. The syndrome generating circuit 7 is a circuit performing an Exclusive OR operation for each bit of the read check bits e, including k bits and the write check bits d, including the same k bits. As a result of this operation, the read check bits e coincide with the write check bits d, if the result of Exclusive OR operation by the syndrome generating circuit 7 is logical "0"; that is, all bits of the syndrome f which is a data train of k bits are lotical "0". In other words, In other words, "there is no error" in such a case. Conversely "there is an error" in the other case. Since the syndrome f of the data train of k bits as described above includes information concerning location of error bit, it can be identified by decoding the syndrome f, which bit out of data bits including m bits is erroneous.

More particularly, the syndrome detector 8 is a decoder converting the syndrome f of k bits into a code of (m+k) bits designating error bit out of the data bits including m bits and the check bits including k bits. For example, output having logical "1"s only at error bit locations out of (m+k) bits and logical "0"s at other bit locations. In addition, the data correction circuit 9 corrects or inverts the error bit or bits out of the above described (m+k) bits. That is, the data correction circuit 9 performs an Exclusive OR operation, for each bit, of the output g of the syndrome decoder 8 and the data bits c and the check bits d to be corrected, so that data only for the error bit or bits are inverted. The error corrected code of (m+k) bits is again written into a predetermined location in the memory cell array 5. Further, of the corrected data i of m bits, a corrected data of $m_0$ ($m_0 < m$) bits is selected by the address decoder 10 in accordance with input address information l and is outputted as the external data output j. In most cases, a large part of the address decoder 10 can be used as an accessing decoder for the data bit memory cell array 3.

FIG. 2 is a circuit diagram showing the structure of the address decoder 10 in detail.

Referring to FIG. 2, the address decoder 10 basically comprises a switching circuit 12 and a main amplifier 13. Although the address decoder 10 receives the corrected data of (m+k) bits from the data correction circuit 9, only the data of m bits out of the corrected data of (m+k) bits is received by the switching circuit 12 in the address decoder 10. More specifically, word lines for only m bits from the data correction circuit 9 are connected to respective one conduction terminals of transistors 16-1 to 16-m constituting the switching circuit 12. The other conduction terminals of these transistors 16-1 to 16-m are connected to an input of the main amplifier 13. The main amplifier 13 amplifies the data inputted through a group of the transistors from the data correction circuit 9 and outputs the amplified data as data j. In addition, decoding signals d to d are applied to the control terminals of the transistors 16-1 to 16-m, respectively. These decoding signals $d_1$ to $d_m$ correspond to the input address information 1 as shown in FIG. 1. In the address decoder 10, the data of $m_0$ bits out of the corrected data of m bits is selected in accordance with the input address information $\phi$, (decoding signals $d_l$ to $d_m$), and outputted as the external data output j.

The address decoder 10 comprises conventional means for writing data of (m+k) bits into the memory cell array 5. However, for simplification of illustration, such conventional portion is omitted from FIG. 2.

It can be appreciated, however, that ECC performed according to the semiconductor memory device as structured and described above, *external* testing of functionality of check bit memory cell array 4 is impossible, since the check bit memory cell array 4 is not externally accessable to test, although the data bit memory cell array 3 can be externally accessed and tested through the switching circuit 12 in the addressing decoder 10.

In an dynamic type of semiconductor memory device comprising an on-chip ECC function, it is generally desirable to have all of the data bits and check bits included in the same ECC code word placed on the same word line. This placement would allow all of data bits and check bits to be internally and concurrently read out, and the ECC system to be easily constructed.

On the other hand, in order to independently and externally test a data bit memory cell array and check bit memory cell array using external testing means, external direct accexss, in other words, read/write functions must be enabled for not only the data bit memory cell array but also the check bit memory cell array. Generally, in order to make such external direct access possible, it is necessary to disconnect and/or disable the conventional ECC circuit system including the circuits 2, 6, 7, 8 and 9 when testing, and alternately to (a) test the check bit memory cell array; and (b) test the data bit memory cell array, by means of an external testing means.

However, the test mode control system necessary would be complicated and costly, since at least two kinds of switching means for the above described testings (a) and (b) would be required.

DISCLOSURE OF THE INVENTION

Accordingly, a principal object of the present invention is to provide a semiconductor memory device which independently and easily tests the functionality of its check bit memory cell arrary out of memory cell arrays.

Another object of the present invention is to provide a semiconductor memory device having on-chip error checking and correcting functions through which a data bit memory cell array or check bit memory cell array can be selectively accessed for external functionality testing.

Briefly stated, the present invention is directed to a semiconductor memory device having on-chip error checking and correcting functions, the memory device comprising memory cell arrays including a data bit memory array and a check bit memory cell array, means for disabling the on-chip error checking and correcting functions in response to an external control signal, means for generating a switching control signal, and switching means responsive to the switching control signal for selectively accessing the check bit memory cell array or the data bit memory cell array, whereby check bits and data bits can be outputted from a single data output terminal.

In accordance with another aspect of the present invention, the switching means comprises means responsive to the switching control signal for selectively applying to the check bit memory cell array a decode signal for reading out data from a corresponding column address of the memory cell array.

In accordance with still another aspect of the present invention, the decode signal is a signal for reading out data from the column address latched by a column address strobe signal used for accessing the memory cell array.

In accordance with still another aspect of the present invention, the decode signal is a signal for reading out data from the column address designated by a internal shift register.

In accordance with yet still another aspect of the present invention, the control signal is a signal the logical value of which changes at a timing responsive to the column address strobe signal used for accessing the memory cell array.

A principal advantage of the present invention is that independent testing of the functionality of the check bit memory cell array is easily performed without requiring additional switching signals, through provision of switching means for switchably accessing the data bit memory cell array, and using the check bit memory cell array using as switching control signals external signals generally used in semiconductor memories, such as a column address strobe (referred to a "CAS" hereinafter) signal.

Another advantage of the present invention is that data bit accessing by latching a row address and a column addres by the control signal, such as /RAS (Row Address Strobe) and /CAS, is not affected by the present invention.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a schematic block diagram showing another embodiment of the present invention; and FIG. 8 is an operational timing diagram for illustrating the operation of the embodiment shown in FIG. 7.

DESCRIPTION OF THE PREFERRED EMBODIMENTS

Figure 3:
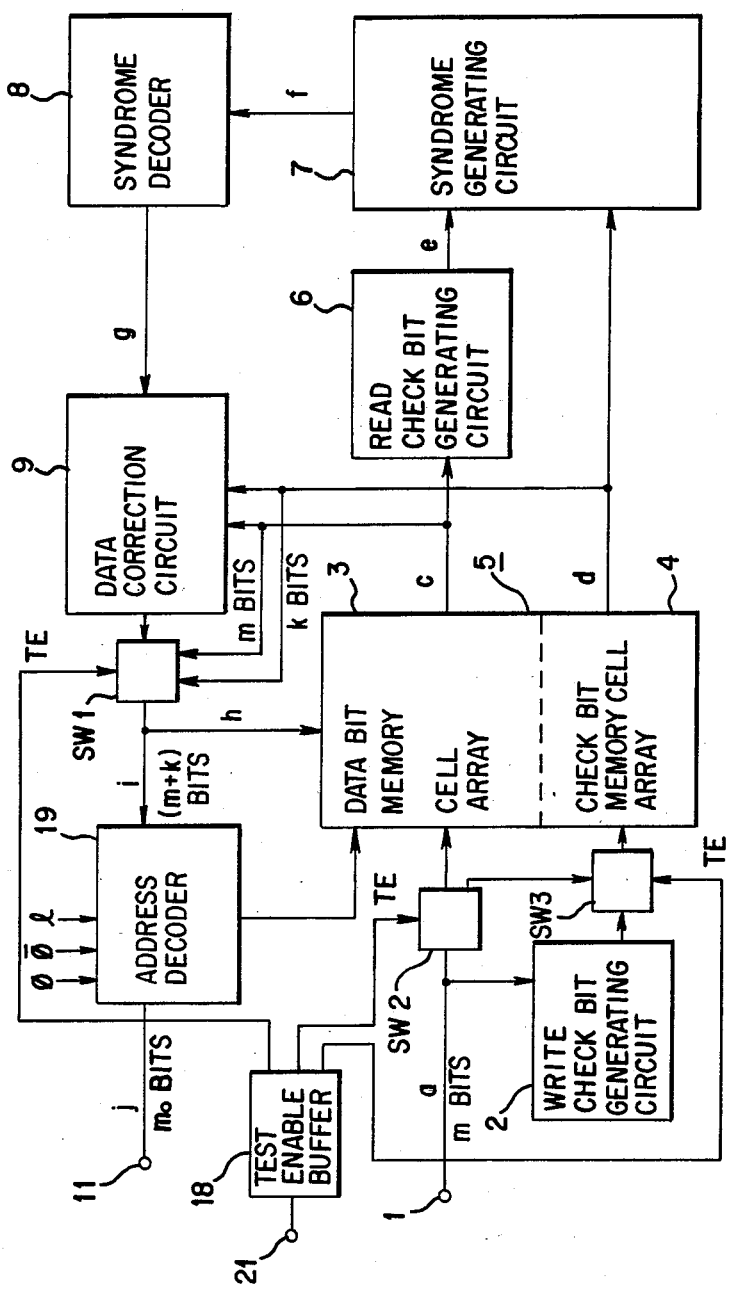
FIG. 3 is a schematic block diagram showing an embodiment of the present invention.

FIG. 3 is a schematic block diagram showing an embodiment of a semiconductor memory device of the present invention.

Figure 1:
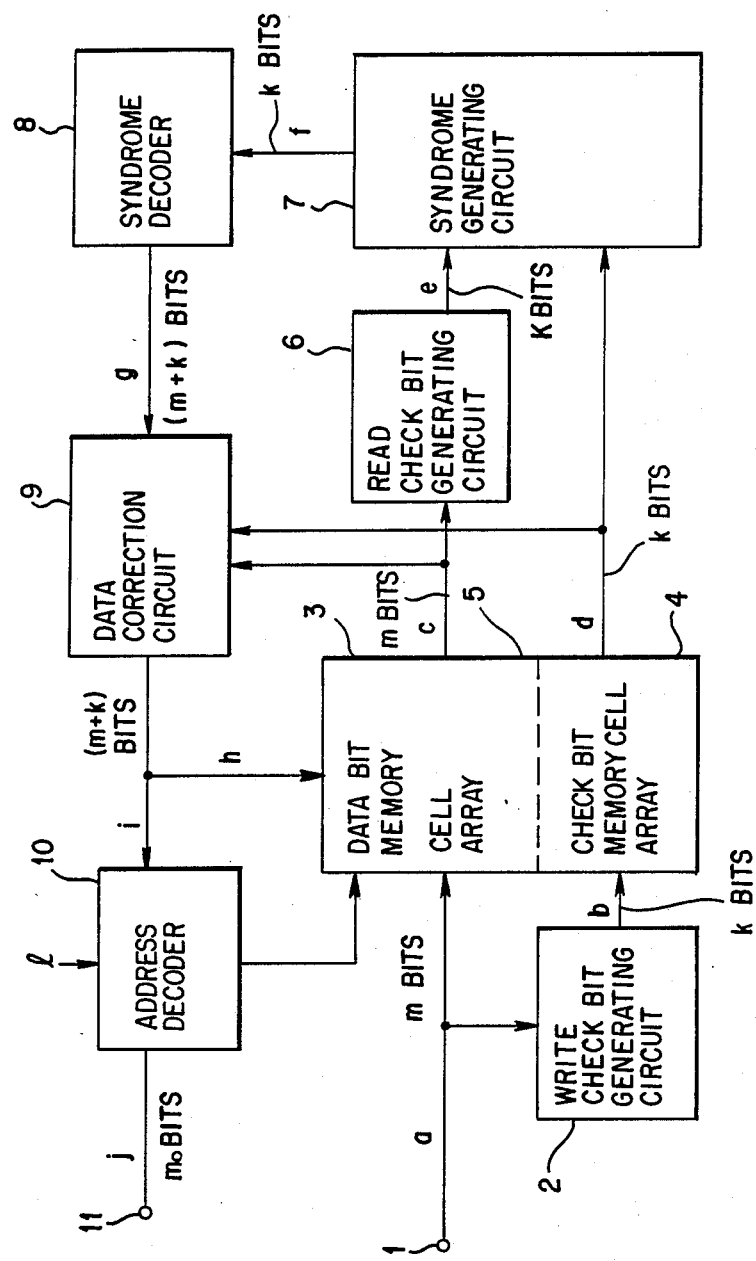
FIG. 1 is a schematic block diagram showing an example of a conventional on-chip ECC circuit.

The semiconductor memory device shown in FIG. 3 is identical to the conventional device shown in FIG. 1 except for the following. In the embodiment of FIG. 3, switching means SW1, SW2 and SW3 are provided, each of which is controlled in response to a test enable signal TE applied from a test enable buffer 18. More specifically, the switching means SW1 selects and outputs data of (m+k) bits from a data correction circuit 9 when the signal TE is at an L level while it selects and outputs data of (m+k) bits from a memory cell array 5 when the signal TE is at an High (H) level. The switching means SW2 applies the inputted data a of m bits to only a data bit memory cell array 3 when the signal TE is at a Low (L) level while it also applies the data a to the switching means SW3 as well when the signal TE is at an H level. In addition, the switching means SW3 selects and outputs the data from a write check bit generating circuit 2 when the signal TE is at an L level while it selects and outputs the inputted data a from the switching means SW2 when the signal TE is at an H level.

Figure 2:
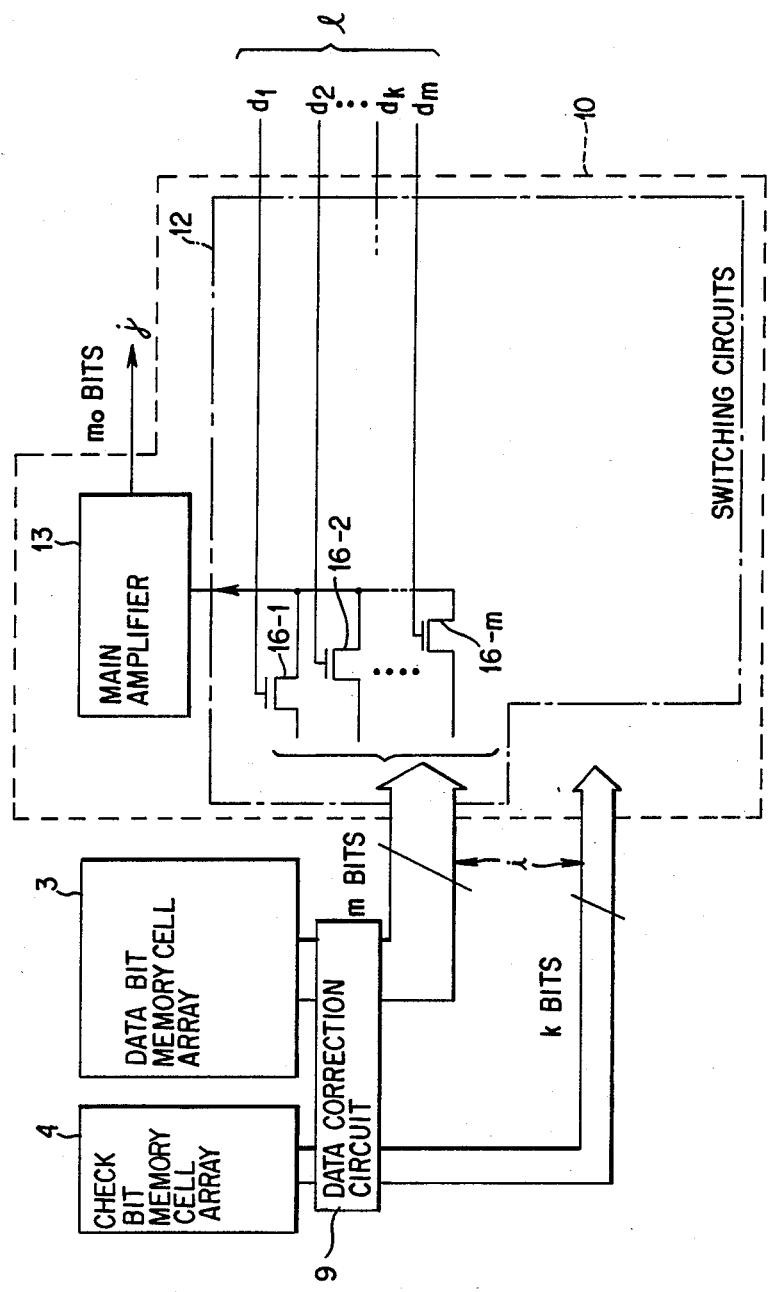
FIG. 2 is a circuit diagram showing the structure of the address decoder shown in FIG. 1.

During normal operating mode, a low level signal is applied to a test enable buffer 18 through a test enable pin 21 externally (through a test device not shown). In response to this signal, the test enable buffer 18 outputs the signal TE at an L level and applies the same to the switching means SW1, SW2 and SW3. As a result, the device shown in FIG. 3 becomes equivalent to the conventional device including ECC system shown in FIG. 1. The operation of such ECC circuit system during normal operating mode is hereinbefore described with reference to FIGS. 1 and 2.

On the other hand, when externally testing functionality of each memory cell array, a high level signal is applied to the test enable buffer 18 through the test enable pin 21 externally. In response to this signal, the test enable buffer 18 outputs the signal TE at an H level and applies the same to the switching means SW1, SW2 and SW3. As a result, the specific data flow testing is enabled.

More specifically, when test data is to be written into the memory cell array 5 for testing, the switching means SW2 applies the inputted test data a of m bits to both the data bit memory cell array 3 and the switching means SW3. Concurrently, the switching means SW3 selects the data a of m bits selected by the switching means SW2 instead of the output of the write check bit generating circuit 2 and applies the same to the check bit memory cell array 4. In other words, a direct data path excluding the write check bit generating circuit 2 is formed between the input terminal 1 and the check bit memory cell array 4 by means of the switching means SW2 and SW3, so that the test data a can be directly written in both the data bit memory cell array 3 and the check bit memory cell array 4.

Subsequently, when test data is read out from the memory cell array during test, the switching means SW1 selects the data c of m bits read out from the data bit memory cell array 3 and the data d of k bits read out from the check bit memory cell array 4 instead of the output of the data correction circuit 9 and applies the same as the data i of (m+k) bits to the address decoder 19 without being corrected. The address decoder 19 selects and outputs the data j of $m_0$ bits out of the data of m bits read from the data bit memory cell array 3 in accordance with the input address information 1 when a control signal $\bar{\phi}$ is at an H level, and selects and outputs the data j of $m_0$ bits out of the data of k bits read from the check bit memory cell array 4 in accordance with the input address information 1 when a control signal $\phi$ is at an H level. The data j of $m_0$ bits outputted through a terminal 11 is applied to an external testing apparatus (not shown) so that the data bit memory cell array 3 and the check bit memory cell array 4 can be tested independently. More specifically, the external testing device determines whether or not the outputted data j is the same as the expected data corresponding to the test data written in the memory cell array. The structure and function of the address decoder 19 will be described hereinafter with reference to FIGS. 4 to 6.

Figure 4:
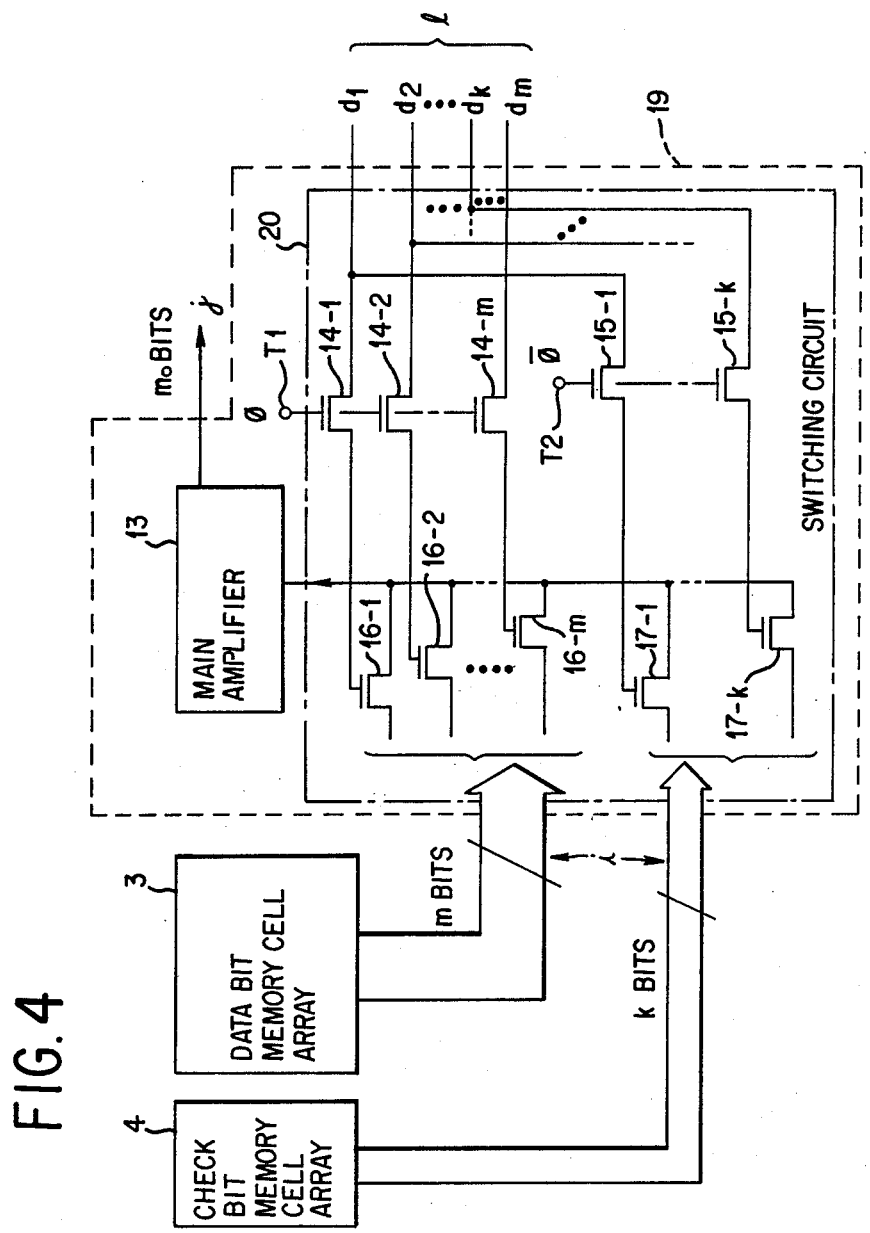
FIG. 4 is a circuit diagram showing the structure of the address decoder shown in FIG. 3.

FIG. 4 is a circuit diagram showing the structure of the address decoder 19 in detail.

Referring to FIG. 4, the address decoder 19 comprises a switching circuit 20 and a main amplifier 13. The switching circuit 20 of FIG. 4 differs from the switching circuit 12 of FIG. 2 in that the switching circuit 20 receives both the data of m bits and the data of k bits.

More specifically, word lines for m bits from a data bit memory cell array 3 are connected to respective one conduction terminals of transistors 16-1 to 16-m constituting a switching circuit 20, and word lines for k bits from a check bit memory cell array 4 are connected to respective one conduction terminals of transistor 17-1 to 17-k also constituting the switching circuit 20. The other conduction terminals of these transistors 16-1 to 16-m and 17-1 to 17-k are connected to an input of the main amplifier 13. The main amplifier 13 amplifies data inputted from the data bit memory cell array 3 or the check bit memory cell array 4 and outputs the amplified data as data j. Additionally, the respective control terminals of the transistors 16-1 to 16-m are connected to the respective one conduction terminals of the transistors 14-1 to 14-m also constituting the switching circuit 20, and the respective control terminals of the transistors 17-1 to 17-k are connected to respective one conduction terminals of transistors 15-1 to 15-k also constituting the switching circuit 20. The other conduction terminals of transistors 14-1 to 14-m are coupled to decoding signals $d_1$ to $d_m$, respectively, and the other conduction terinals of the transistors 15-1 to 15-k are coupled to decoding signals $d_l$ to $d_k$, respectively. Decoding signals $d_l$ to $d_m$ correspond to the input address information 1 as shown in FIG. 3. A control signal $\bar{\phi}$ is applied to each control terminal of the transistors 14-1 to 14-m through an input terminal $T_1$, and a control signal $\bar{\phi}$, complementary to signal $\phi$ is applied to each control terminal of the transistors 15-1 to 15-k through an input terminal $T_2$.

Figures 5, 6:
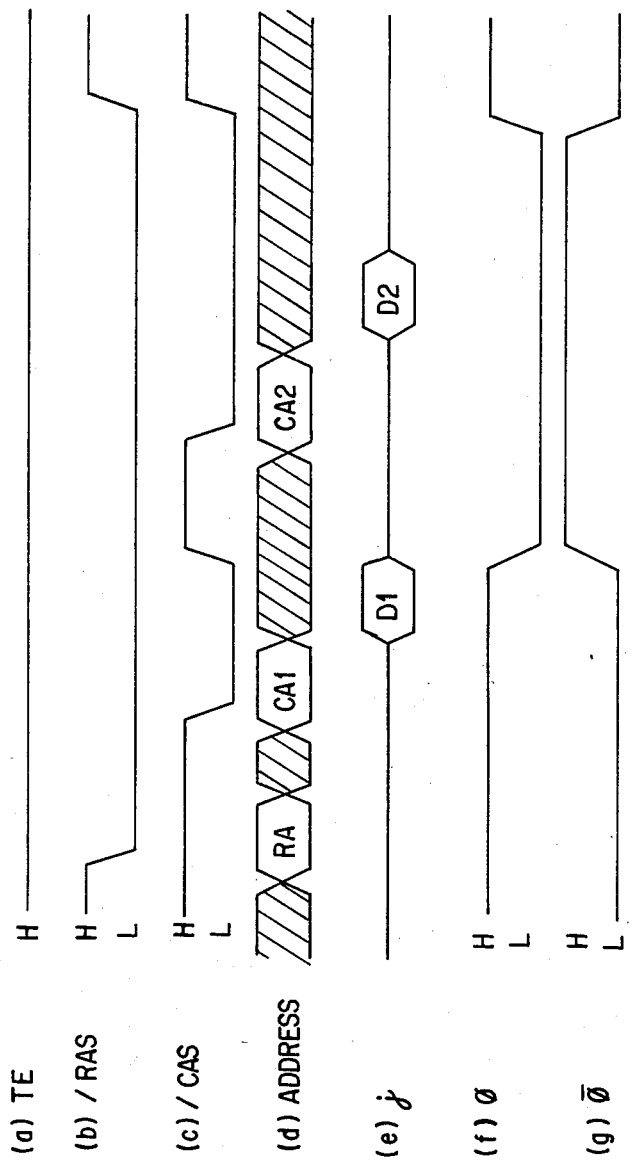
FIG. 5 is an operational timing diagram for illustrating the operation of the embodiment shown in FIG. 2.
FIG. 6 is a diagram showing a structure of a memory cell array corresponding to the operational timing shown in FIG. 5.

FIG. 5 is an operational timing diagram of an embodiment shown in FIG. 4, and FIG. 6 is a diagram showing a structure of a memory cell array corresponding to the operational timing shown in FIG. 5.

Now, referring to FIGS. 5 and 6, the operation of an embodiment shown in FIG. 4 will be described.

First, the access cycle of a memory cell array is initiated by rendering a signal TE a High level, as shown in FIG. 5(a). Next, in response to the falling of /RAS to a Low level as shown in FIG. 5(b), a row address (RA) of the memory cell array is latched as shown in FIG. 5(d). Subsequently, in response to the falling of /CAS to a Low level as shown in FIG. 5(c), the first column address CA1 of the memory cell array is latched as shown in FIG. 5(d). That is, a signal $\phi$ applied to each control terminal of transistors 14-1 to 14-m is at a H level as shown in FIG. 5(f), and hence, each transistor is rendered conductive, whereas a signal $\bar{\phi}$ applied to each control terminal of transistors 15-1 to 15-k is at a L level as shown in FIG. 5(g), render each transistor non-conductive. As a result, decoding signals $d_l$ to $d_m$, corresponding to a column address input are applied through the transistors 14-1 to 14-m to control terminals of transistors 16-1 to 16-m. Data D1 corresponding to the column address CA1 is read out from a data bit memory cell array 3 to a main amplifier 13, as shown in FIG. 5(e). That is, the data output D1 is data bit data of the address designated or specified by (RA, CA1), as shown in FIG. 6.

When /CAS rises from a L level to a H level with /RAS in a L level as shown in FIGS. 5(b) and 5(c), the signal $\phi$ falls from a H level to a L level as shown in FIG. 5(f). Thus, the transistors 14-1 to 14-m are rendered non-conductive, whereas the transistors 15-1 to 15-k are rendered conductive. Therefore, application of the decoding signals $d_l$ to $d_k$ corresponding to the column address input is changed from the side of data bits to the side of check bits, so that switching of the check bits to the access mode is enabled. When /CAS rises and falls with /RAS in a L level as shwn in FIGS. 5(b) and 5(c), the second column address CA2 is latched as shown in FIG. 5(d), and the decoded signals $d_l$ to $d_k$ corresponding to the column address input are applied through the transistors 15-1 to 15-k to control terminals of transistors 17-1 to 17-k. Thus, data D2 corresponding to the column address CA2 is read out from a check bit memory cell array 4 to the main amplifier 13, as shown in FIG. 5(e). That is, the second data output D2 is check bit data of the address designated by (RA, CA2), as shown in FIG. 6. In this embodiment, accessing of check bits will continue, if /CAS continues to change state.

FIG. 7 is a schematic block diagram showing a semiconductor memory device of another embodiment of the present invention, and FIG. 8 is the operational timing diagram thereof.

The circuit shown in FIG. 7 is identical to the circuit shown in FIG. 4 except for the following. In the embodiment of FIG. 7, a switching circuit 23 is adapted such that decode signals $d_l$ to $d_k$ corresponding to a column address are received, not from an external source but from a shift register 22 provided within the semiconductor memory device, at the time of accessing a check bit. The shift register 22 has a start address CA1 when a cycle starts, and shifts the registered contents bit by bit in response to rising and falling of /CAS. This allows a check bit memory cell array to be sequentially accessed even if the column address is not externally inputted. Since the column address system is inoperative in such a case, fast test operation is made possible.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A semiconductor memory device having on-chip error checking and correcting functions comprising:
   a plurality of memory cell arrays, said arrays including a data bit memory cell array for storing data words of m bits each and a check bit memory cell array for storing data including error correction codes having k check bits each;
   error checking and correcting means including
   (a) error code generation means for receiving input data words and, in response, generating said error correction codes,
   (b) error code writing means for storing said error codes in said check bit memory cell array, and
   (c) data correction means for reading said data words stored in said data bit memory cell array and said error codes stored in said check bit array and, in response thereto, supplying a corrected data word output;
   clock input means for receiving a switching control signal;
   means for disabling said on-chip error checking and correcting means in response to an external test mode enable control signal (TE);
   data writing means for writing data into said memory cell arrays; and
   data reading means for supplying data words from said data correction means and from said check bit memory cell array, said data reading means including a single data output terminal and switching mans responsive to said switching control signal for alternatingly accessing said check bit memory cell array and said data bit memory cell array through said error checking and correction means for successively outputting check bits and data bits from said single data output terminal in an interleaved manner.

2. A semiconductor memory device in accordance with claim 1, wherein said switching means responsive to said switching control signal for selectively applying to said check bit memory cell array a decode signal for reading out data from a corresponding column address of said memory cell array.

3. A semiconductor memory device in accordance with claim 2, wherein said switching control means comprises a column address strobe signal.

4. A semiconductor memory device in accordance with claim 2, further comprising internal shift register means for storing a column address.

5. A semiconductor memory device in accordance with claim 4, wherein said decode signal is a signal for reading out data from a column address stored by said internal shift register means.

6. A semiconductor memory device in accordance with claim 1, wherein said control signal comprises a signal which changes logical value at a timing responsive to a column address strobe signal.

7. A semiconductor memory device having on-chip error checking and correcting functions, comprising:

a plurality of memory cell arrays, said arrays including at least one data bit memory cell array for storing data bits and at least one check bit memory cell array for storing data including check bits;

switching control means, said switching control means comprising a column address strobe signal;

on-chip error checking and correcting means for generating said check bits in response to said data bits and for correcting said data bits in response to said check bits;

means for disabling said on-chip error checking and correcting means in response to an external control signal;

data input means for receiving data information;

data writing means for writing said data information into said data bit memory cell array of said memory cell arrays and for writing said check bits generated by said on-chip checking and correcting means into said check bit memory cell array of said memory cell array; and data reading means for reading out data information and check bits from said memory cell arrays, said data reading means including a single data output terminal and switching means responsive to said switching control means for alternatingly accessing said check bit memory cell array and said data bit memory cell array so that check bits and data bits can be outputted from said single data output terminal successively in an interleaved manner.

* * * * *